(12) United States Patent
Bebernes

(10) Patent No.: US 8,678,113 B2
(45) Date of Patent: Mar. 25, 2014

(54) STEERING AND GROUND SPEED CONTROL MECHANISM OF A DUAL-PATH HYDROSTATIC DRIVE ARRANGEMENT

(75) Inventor: Thomas Daryl Bebernes, Ottumwa, IA (US)

(73) Assignee: Deere & Company, Moline, IL (US)

( * ) Notice: Subject to any disclaimer, the term of this patent is extended or adjusted under 35 U.S.C. 154(b) by 380 days.

(21) Appl. No.: 13/093,361

(22) Filed: Apr. 25, 2011

(65) Prior Publication Data

US 2012/0267176 A1 Oct. 25, 2012

(51) Int. Cl.
*B60K 17/00* (2006.01)
(52) U.S. Cl.
USPC ........... 180/6.48; 180/6.2; 180/6.32; 180/307
(58) Field of Classification Search
USPC ................. 180/6.48, 6.2, 6.32, 307
See application file for complete search history.

(56) References Cited

U.S. PATENT DOCUMENTS

| 4,126,994 | A  | * | 11/1978 | Rockwell | 60/420 |
| 5,649,606 | A  | * | 7/1997  | Bebernes et al. | 180/307 |
| 6,523,635 | B1 | * | 2/2003  | Johnston et al. | 180/307 |
| 7,954,907 | B1 | * | 6/2011  | Wieber et al. | 303/3 |

* cited by examiner

*Primary Examiner* — Kevin Hurley
*Assistant Examiner* — Michael Stabley

(57) ABSTRACT

A dual-path hydrostatic drive arrangement for driving ground wheels at the opposite sides of the front of a self-propelled windrower is controlled for effecting steering and ground speed changes by a control mechanism including a gear train defined by a steering input gear and idler gear and steering output gears carried by a gear support member mounted for pivoting about a fixed axis of rotation of the input gear. The output gear is coupled for transmitting movement to first and second pump displacement control rods and steering is effected by turning a steering wheel which is coupled for rotating the input gear so as to impart rotation to the output gear which rotates so as to cause the control rods to move different amounts or in different directions. Speed changes are effected by a speed control device that is coupled for selectively swinging the speed/direction control arm.

6 Claims, 2 Drawing Sheets

STEERING AND GROUND SPEED CONTROL MECHANISM OF A DUAL-PATH HYDROSTATIC DRIVE ARRANGEMENT

FIELD OF THE INVENTION

The present invention relates to a steering and ground speed control for a vehicle equipped with a dual-path hydrostatic transmission for driving opposite ground wheels of the vehicle.

BACKGROUND OF THE INVENTION

U.S. Pat. No. 5,649,606 is directed to a steering and ground speed control mechanism for a self-propelled windrower having front ground wheels driven by a dual-path hydrostatic transmission. This control mechanism uses two belt sprockets to provide independent control of steering and ground speed. The first sprocket is driven through a gear reduction by the steering wheel. The second sprocket is mounted to a speed and direction control arm mounted for pivoting about the axis of the first sprocket and for being driven by a timing belt entrained about the first and second sprockets. A control plate is coupled for being either rotated by the second sprocket or for being swung with the second sprocket about an axis passing through a rotation axis of the first sprocket. First and second control rods have respective first ends coupled to the control plate and respective second ends coupled to displacement and direction controllers of first and second pumps of the hydrostatic transmission, with ground speed and direction being controlled by moving both rods together in the same direction by swinging the control plate and with steering being done by moving the rods in opposite directions by pivoting the control plate.

U.S. Pat. No. 6,523,635 discloses a refinement of the control mechanism disclosed in the above-described '606 patent, wherein the timed sprocket arrangement is replaced by a four-bar linkage arrangement. While the four-bar linkage arrangement has the advantage of avoiding the cost and complexity of the timing belt drive, the four-bar linkage arrangement is also rather complex. A more simplified control mechanism is desired.

SUMMARY OF THE INVENTION

According to the present invention, there is provided an improved control mechanism for controlling both the steering and ground speed of a vehicle equipped with a dual-path hydrostatic transmission for driving opposite ground wheels of the vehicle.

An object of the invention is to provide a control mechanism including a control plate that is oscillated about a pivot axis for steering operation and is translated by pivoting a support arm for the support plate about a second pivot axis for speed and/or direction change operations, with the steering operation being initiated by a steering wheel coupled to the control plate by connection elements including a gear train.

The foregoing object is achieved by coupling a steering wheel for effecting rotation of a steering input gear that is coupled by an intermediate idler gear for rotating a steering output gear, the input, idler and output gears constituting a gear train that is carried by a support arm mounted for swinging about the second pivot axis, with the output gear being mounted for rotating about the first axis.

This and other objects will become apparent by a reading of the ensuing description together with the appended drawings.

DESCRIPTION OF THE PREFERRED EMBODIMENT

Preliminarily, it is noted that the disclosures of U.S. Pat. Nos. 5,649,606 and 6,523,635 are incorporated herein by reference.

Figure 1:
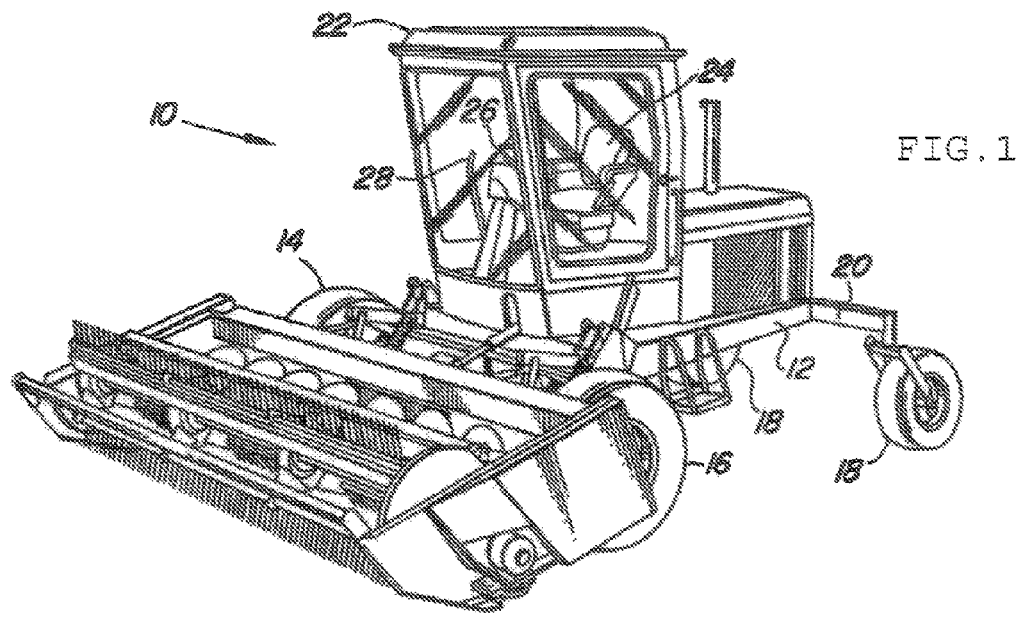
FIG. 1 is a left front schematic perspective view of a self-propelled windrower which is exemplary of the type of vehicle with which the present invention is particularly adapted for use.

Referring to FIG. 1, there is shown a self-propelled vehicle 10 in the form of a windrower or swather having a main frame 12 supported on right- and left-hand front drive wheels 14 and 16, respectively, and on a pair of rear ground wheels 18 castor-mounted to opposite ends of a cross axle 20 that is mounted to the main frame 12, in a known manner, not shown. An operator's cab 22 is supported on a forward end location of the main frame 12 and contains a seat 24 mounted to a floor of the cab in easy reach of a steering wheel 26 positioned forwardly of the seat and a speed/direction control lever 28 positioned right ward of the seat.

Figure 2:
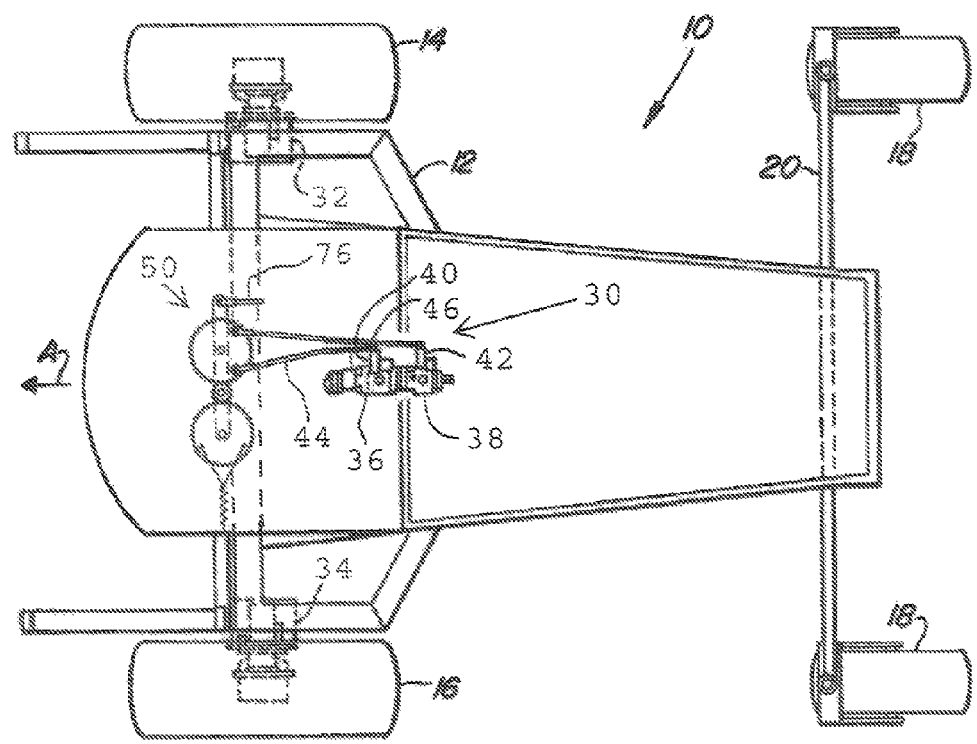
FIG. 2 is a schematic top view showing the placement of the hydrostatic drive system components within the general outline of the self-propelled windrower shown in FIG. 1.

Referring now also to FIG. 2, it can be seen that the drive wheels 14 and 16 are driven by a dual-path hydrostatic transmission system 30 including right- and left-hand fixed displacement motors 32 and 34, respectively, coupled to the right- and left-hand drive wheels 14 and 16. Front and rear variable displacement, reversible pumps 36 and 38, respectively, are conventionally fluid-coupled to the motors 32 and 34, as by respective pairs of supply/return lines (not shown), are mounted centrally on the frame 12 and are coupled for being driven by an output shaft of the vehicle engine (not shown). The pumps 36 and 38 are respectively provided with displacement/direction control arms 40 and 42 which respectively receive steering and speed/direction control inputs by way of control rods 44 and 46 having rear ends connected to the control arms and having forward ends connected to a control mechanism 50, as described below in more detail.

Figure 3:
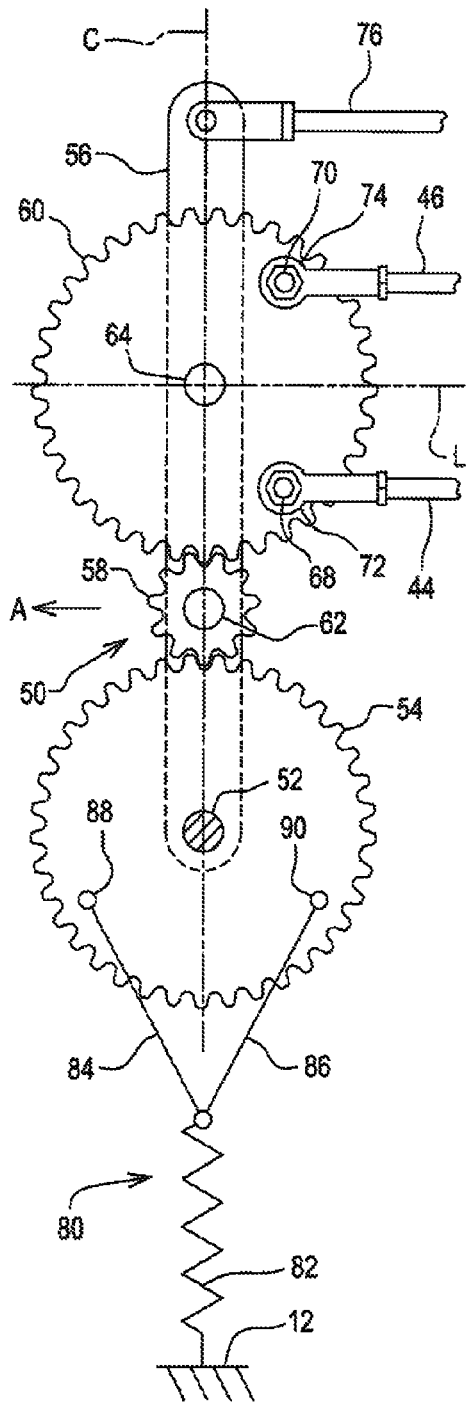
FIG. 3 is a top view showing just the gear train, gear train support and control plate of the steering and speed/direction control mechanism of the present invention.

Referring now also to FIG. 3. There is shown that portion of the control mechanism 50 for receiving inputs from the steering wheel 26 and from the speed/direction control lever 28. Specifically, there is shown a steering shaft 52, which is coupled in a conventional manner (not shown) for being rotated in opposite directions by the steering wheel 26. Mounted for rotating with the steering shaft 52 about a first upright axis is a steering input gear 54. Mounted for pivoting about the shaft 52 is a gear support member or arm 56. An idler gear 58 is meshed with the steering input gear 54 and with a steering output gear 60. The idler gear 58 is mounted for rotation about a first support shaft 62 fixed to the support arm 56 along a second upright axis, and the output gear 60 is mounted for rotation about a second support shaft 64 mounted to the support arm 56 about a third upright axis, with the idler gear 58 being shown located on a line of centers C passing through the first and third upright axes, but could be offset from the line of centers C. The output gear 60 serves as a control plate arrangement for the transmission pumps 36 and 38.

Specifically, secured directly to the output gear 60 at respective locations spaced on opposite sides of a vertical plane L bisecting the gear 60 and disposed perpendicular to the centerline C when the steering input gear 54 is in its centered position, as shown, are respective front ends of the first and second control rods 44 and 46, this connection being afforded by upright fasteners 68 and 70 respectively received in ball-joints 72 and 74 that define the forward ends of the control rods 44 and 46.

It is here noted that the control mechanism 50 is illustrated in a neutral condition wherein the rods 46 establish neutral conditions in each of the pumps 36 and 38, and the line of centers C is oriented substantially perpendicular to a straight forward direction of travel A. In this condition, the control rod end fasteners 68 and 70 are located at equal distances from a vertical plane L bisecting the output gear 60 and extending perpendicular to the line of centers C. It will be understood that the exact locations of the rod fasteners 68 and 70 is not critical and that additional holes for alternate connections may be provided for modifying the steering characteristic of the vehicle. Further, it is to be noted that the input and output gears 54 and 60 need not be complete circular gears, but may be gear segments having sufficient teeth for effecting a preselected maximum turning radius of the vehicle 10.

Figure 4:
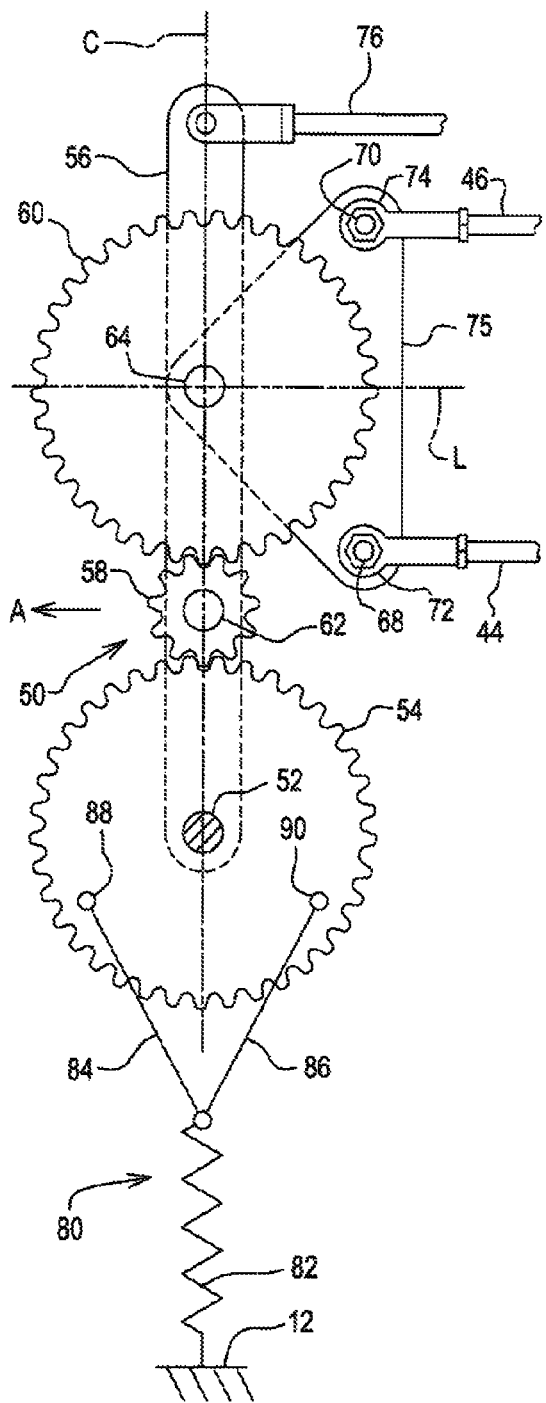
FIG. 4 is a view like that of FIG. 3, but showing an alternate embodiment of the control arrangement wherein the transmission control rods are coupled to a triangular control plate that is fixed for rotation with the output gear.

Referring now to FIG. 4, there is shown an alternate embodiment of the invention wherein the control arrangement for the pumps 36 and 38 includes the gear 60 together with a control plate 75 having a form substantially that of an isosceles triangle. The control plate 75 extends below the output gear 60 and has a corner keyed, welded or otherwise fixed to the shaft 64, with the output gear 60 in this embodiment likewise being fixed to the shaft 64 so that rotation of the gear 60 will be transferred to the control plate 75. In this case, the ball joints 72 and 74 respectively defining the forward ends of the control rods 44 and 46 are coupled to the remaining two corners of the control plate by the fasteners 68 and 70. It will be appreciated that the control plate 75 could be other shapes, one example of which would be a T-shape with the stem fixed to the shaft 64 and the control rods being connected to opposite ends of the arm of the T.

A speed/direction input cable 76 of a push-pull cable assembly (not shown), which is coupled in a well known manner (not shown) for being pushed or pulled by operation of the speed/direction control lever 28, is coupled to the right end of the gear support arm 56, with increasing speed in a forward direction being initiated by pulling the arm 56 rearward causing rearward movement of each of the pump control arms 40 and 42 to cause the pumps 36 and 38 to deliver fluid to the motors 32 and 34 so as to cause the latter to power the ground wheels for propelling the vehicle 10 in the forward direction at a speed determined by the amount of forward displacement of the control lever 28 from its "neutral" position. Of course, reverse movement of the vehicle 10 may be accomplished in a similar manner by moving the control lever 28 in a rearward direction from its "neutral" position.

A return-to-center device 80 is provided for automatically returning the input gear 54 and, hence, the steering wheel 26 to its centered position upon release of the steering wheel. Specifically, the device 80 includes a tensioned coil tension spring 82 coupled between the frame 12 and first ends of front and rear cables 84 and 86 having second ends respectively coupled to the input gear 54 at locations 88 and 90 spaced equally from the line of centers C when the control mechanism 50 is shown in the neutral condition shown in FIG. 3. It will be appreciated then that a rightward steering input from the steering wheel 26 will cause clockwise rotation of the input gear 54. This rotation of the input gear 54 will cause the cable 84 to move so as to increase the tension in the spring 82 while the cable 86 becomes slack. Releasing the steering wheel 26 will then result in the spring pulling on the cable 84 to bring the input gear 54 back to its starting position with the steering wheel 26 being likewise returned to its starting position.

The operation of the control mechanism 50 is thought to be clear from the description. Suffice it to say that the usage of the gear train comprising the input gear 54, idler gear 58 and output gear 60 together with the gear support arm 56 represents a simplification of the control mechanisms disclosed in each of U.S. Pat. Nos. 5,649,606 and 6,523,635 and provides a compact arrangement for transferring steering and speed/direction inputs to the pump control arms 40 and 42 by way of the control rods 44 and 46.

Having described the preferred embodiment, it will become apparent that various modifications can be made without departing from the scope of the invention as defined in the accompanying claims.

The invention claimed is:

1. In a vehicle equipped with a dual-path hydrostatic transmission for driving a pair of ground wheels of the vehicle, a steering and ground-speed control mechanism, comprising:
   an upright steering shaft mounted for rotating about a first upright axis defined by said steering shaft;
   an elongate gear support member mounted for pivoting about said first upright axis together with said steering shaft;
   a gear train including a steering input gear mounted for rotating together with said steering shaft about said first upright axis, an idler gear meshed with said input gear and a steering output gear meshed with said idler gear, with said idler and output gears each being mounted to said gear support member for respectively rotating about a second upright axis and a third upright axis;
   a steering wheel being coupled to said steering input gear for selectively rotating the input gear in opposite directions from a centered position corresponding to a straight ahead driving condition of the vehicle;
   said hydrostatic transmission including first and second pumps respectively having first and second displacement control arms;
   a control plate arrangement including said output gear;
   first and second control rods extending crosswise to a line of centers of said input, idler and output gears and having first ends respectively pivotally connected to said control plate arrangement and being rotatable with said output gear, and having second ends respectively coupled to said first and second displacement control arms, with said first ends being so located relative to said third upright axis that rotation of said output gear will cause one of said control rods to pull on an associated one of said control arms and will cause another of said control rods to push on an associated other one of said control arms, and that swinging of said gear support member about said first upright axis selectively in opposite first and second directions from a neutral position, corresponding to a neutral position of said first and second displacement control arms will respectively increase the displacement of said first and second pumps respectively for increasing the drive speed of the pumps in forward and reverse driving operation.

2. The vehicle, as defined in claim 1, wherein said output gear defines said control plate arrangement, with said first ends of said control rods being coupled directly to said output gear.

3. The vehicle, as defined in claim 2, wherein said output gear is circular.

4. The vehicle, as defined in claim 1, wherein said control arrangement includes a control plate separate from, but being fixed for pivoting together with, said output gear about said third upright axis; and an upright shaft being rotatably mounted in said gear support arm and defining said third upright axis; and said output gear and said control plate being fixed to said upright shaft.

5. The vehicle, as defined in claim 1, and further including a speed/direction Input arrangement being coupled to said gear support member for selectively pivoting said gear support member in opposite directions about said first upright axis.

6. The vehicle, as defined in claim 5, wherein said speed/direction input arrangement includes a manually operable lever.

* * * * *